United States Patent [19]

Gonas

[11] Patent Number: 4,731,708
[45] Date of Patent: Mar. 15, 1988

[54] COMBINATION REAR WINDOW BRAKE LIGHT AND CONVENIENCE LIGHT

[75] Inventor: Albert J. Gonas, Grosse Point, Mich.

[73] Assignee: Voplex Corporation, Pittsford, N.Y.

[21] Appl. No.: 909,890

[22] Filed: Sep. 22, 1986

[51] Int. Cl.$^4$ .............................................. B60Q 11/00
[52] U.S. Cl. ...................................... 362/80; 362/242; 340/97; 340/84
[58] Field of Search ............... 362/227, 234, 251, 242, 362/155, 156, 157, 243, 61, 80, 277, 282, 319, 322; 340/84, 87, 97, 100, 89

[56] References Cited

U.S. PATENT DOCUMENTS

| | | | |
|---|---|---|---|
| 1,370,674 | 3/1921 | Smith | 340/97 |
| 1,385,006 | 7/1921 | Kemp | 340/87 |
| 1,599,958 | 9/1926 | Fraser | 340/84 |
| 1,800,078 | 4/1931 | Johnson | 362/267 |
| 2,129,070 | 9/1938 | Rottinger | 362/80 |
| 2,276,104 | 3/1942 | Shaunessey | 364/242 |
| 2,783,365 | 2/1957 | Wiffert | 362/80 |
| 3,432,808 | 3/1969 | Fleece | 340/84 |
| 3,436,758 | 4/1969 | Kluth | 340/97 |
| 3,493,924 | 2/1970 | Dobbins | 340/97 |
| 4,227,242 | 10/1980 | Marcus | 362/61 |

Primary Examiner—William A. Cuchlinski, Jr.
Assistant Examiner—D. M. Cox
Attorney, Agent, or Firm—Stonebraker, Shepard & Stephens

[57] ABSTRACT

A combination brake light and convenience light for use in the rear of an automotive vehicle is disclosed. A brake light 8 faces and illuminates through the rear window 4, and the convenience light 14 faces forward and downward over the shoulder of a rear seat occupant. A hinged cover 20 over the convenience light 14 serves three purposes: it esthetically covers the light when not in use; it prevents direct incidence of its light upon the driver's rear view mirror or the driver's line of sight; and it operates the on-off switch for the convenience light.

4 Claims, 2 Drawing Figures

COMBINATION REAR WINDOW BRAKE LIGHT AND CONVENIENCE LIGHT

BACKGROUND OF THE INVENTION

This invention relates to automotive brake lights, and more particularly to a combination of brake light with an added convenience light for occupants of an automotive vehicle.

In the past and until very recently, motor vehicle brake lights have generally been placed on the left and right rear corners of the vehicles. At the present time, all new automobiles manufactured or sold in the United States require rear window brake lights, these being higher and more noticeable to the driver following. This requirement brings electric wiring to a position behind the shoulders of the rear seat occupants of automotive vehicles, and this in turn creates an opportunity to make additional use of such wiring for a convenience light for the rear seat occupants.

U.S. Pat. Nos. 1,599,958 to Fraser, 2,129,070 to Rottinger, and 4,227,242 to Marcus are the closest related prior art that I know of. The Fraser patent shows, in a similar environment, a single light which is on at all times, serving the double function of rearward signal illumination and forward interior illumination, as best illustrated in FIGS. 1 and 2 of the Fraser patent. The Rottinger patent shows, again in a similar environment, a single rear light which is also on at all times. A semi-cylindrical reflector surrounding the light is swivelable on its axis to alternatively direct light either rearward or forward as desired. The Marcus patent shows an automobile visor mirror-light combination in which the light is controlled by a switch actuated by a flip cover.

SUMMARY OF THE INVENTION

The present invention is a combination brake light and convenience light for use in the rear of an automotive vehicle. The brake light, operating in the usual way, faces out through the rear window of the vehicle. The convenience light faces forward and downward over the shoulder of a rear seat occupant. A hinged cover over the convenience light serves three purposes. It esthetically covers the light when not in use; it acts as a visor to prevent direct rays from incidence on the driver's line of sight in the rear view mirror; and it operates the on-off switch for the convenience light.

DRAWINGS

FIG. 1 is a somewhat schematic side-sectional view of the combination brake light and convenience light of this invention; and FIG. 2 is a front view of the device in FIG. 1, as viewed from the right side of FIG. 1.

DETAILED DESCRIPTION

Figure 1:
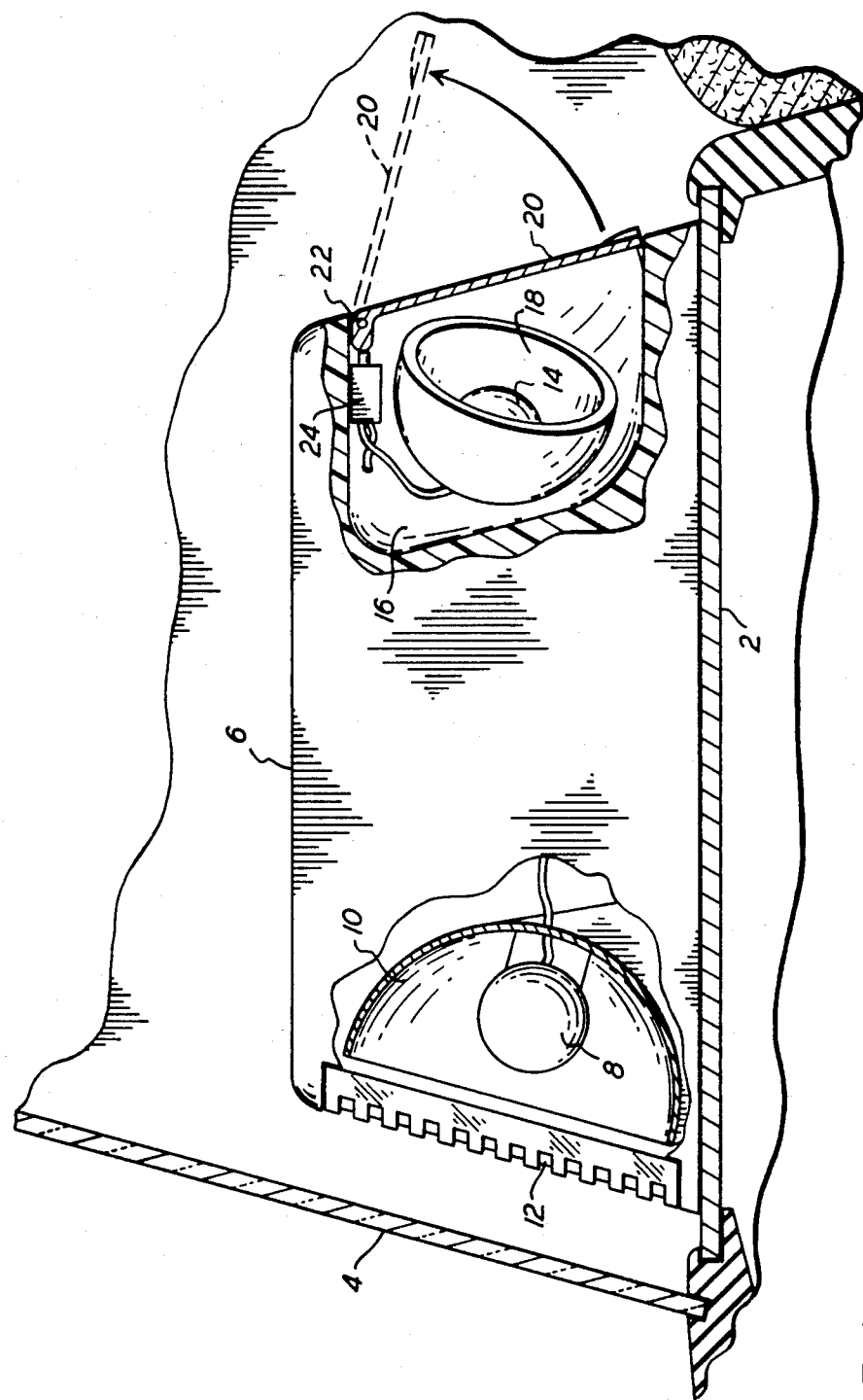

Referring now to FIG. 1, it will be helpful to set the stage. The viewer is looking from the right side of an automobile, along the rear shelf 2 behind the back seat. Rear window 4 is shown extending upward and broken away. The combination brake light and convenience light is housed in a housing 6. A brake light 8 is suitably mounted in the rear portion of housing 6, surrounded by a reflector 10. A window or lens 12 extends across the rear of the housing 6 and over the light 8 and reflector 10. Brake light 8 is operatively connected in the usual way to the braking system of the vehicle, so that it turns on when the brakes are applied and turns off when the brake pedal is released. Brake light 8 is thus used intermittently, and only in response to the braking system.

In the forward part of the housing 6, one or more individual convenience lights 14 are swivelably mounted within the housing and are generally directed forwardly and downwardly to direct illumination over the shoulders of rear seat occupants. Lights 14 are located within an enclosure or cavity 16. Each of the lights 14 is partially surrounded by a reflector 18, and the cavity space surrounding each reflector permits convenient aiming of each light-reflector combination in its swivel mount.

A cover plate 20 is mounted over the cavity 16 and is hinged at 22 for pivotal movement about the axis of its top edge. In solid lines, cover 20 is shown as being closed over the convenience lights 14. The phantom lines represent the cover 20 in its open position.

Figure 2:
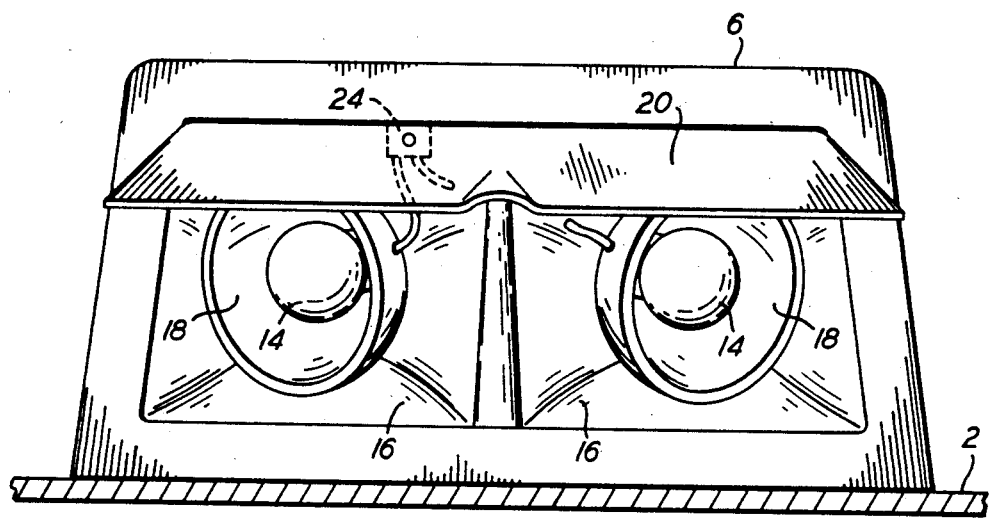

FIG. 2 is a front view of the convenience light arrangement including lights 14, reflectors 18, and cover 20 shown in its open position.

Referring back to FIG. 1, a switch 24 is operatively connected to the convenience light 14 and to the cover 20 such that when the cover is open, the switch is operative to turn the light or lights on and when the cover is closed, the lights are off. Lights 14 are thus controlled only by the cover-operated switch; they ae not tied in with the brake light.

The cover 20 is of such size and configuration that direct rays from the light 14 are not incident on the driver's line of sight in the rear view mirror, thus not causing direct glare to impede the driver's vision.

In its closed position, in addition to switching off the convenience light 14, the cover 20 provides an esthetic covering over the lights when they are not in use.

I claim:

1. A combination brake light and convenience light for an automotive vehicle, including:
   a. a housing arranged within said vehicle on a shelf between a rear seat of said vehicle and a rear window of said vehicle so that said housing is visible from behind said vehicle through said rear window;
   b. a brake light disposed within said housing and responsive to the operation of the braking system of said vehicle to signal such operation through said rear window;
   c. a convenience light disposed within said housing separate from said brake light and arranged for directing illumination generally forward and downward for use by rear seat occupants of said vehicle;
   d. a hinged cover mounted on said housing over said convenience light;
   e. a switch responsive to the opening of said cover to energize said convenience light, and responsive to the closing of said cover to deenergize said convenience light; and
   f. said cover in its open position preventing direct incidence of illumination from said convenience light upon the rear view mirror line of sight of the operator of said vehicle.

2. The combination as defined in claim 1 wherein a pair of said convenience lights are arranged under said cover and aimed to direct illumination toward a pair of said rear seat occupants.

3. A combination brake light and convenience light for an automotive vehicle, including:

a. a housing adapted for placement within said vehicle on a shelf between a rear seat of said vehicle and a rear window of said vehicle so that said housing is visible through said rear window from behind said vehicle;

b. a brake light disposed within said housing and operatively connected to the braking system of said vehicle for producing a brake light signal visible through said rear window from behind said vehicle;

c. a convenience light disposed within said housing, said convenience light including a cover adapted to open and close and to prevent direct incidence of illumination from said convenience light upon the rear view mirror line of sight of the operator of said vehicle, said convenience light being operatively connected to said cover whereby said convenience light is energized by opening of said cover and is deenergized by closing of said cover; and d. said convenience light being aimed generally downward and forward to direct illumination usable by rear seat occupants of said vehicle.

4. The combination as defined in claim 3 wherein a pair of sad convenience lights are arranged under said cover and aimed to direct illumination toward a pair of said rear seat occupants.

* * * * *